Jan. 1, 1952   R. B. JOHNSON   2,580,788
SELECTIVE PRINTING AND PUNCHING MECHANISM
Original Filed Nov. 6, 1946   11 Sheets-Sheet 1

INVENTOR
Reynold B. Johnson
BY
William Lang
ATTORNEY

Jan. 1, 1952  R. B. JOHNSON  2,580,788
SELECTIVE PRINTING AND PUNCHING MECHANISM
Original Filed Nov. 6, 1946  11 Sheets-Sheet 2

INVENTOR
Reynold B. Johnson
BY
William Lang
ATTORNEY

Fig. 6.

Jan. 1, 1952   R. B. JOHNSON   2,580,788
SELECTIVE PRINTING AND PUNCHING MECHANISM
Original Filed Nov. 6, 1946   11 Sheets-Sheet 5

INVENTOR
Reynold B. Johnson
BY
William Lang
ATTORNEY

Jan. 1, 1952 R. B. JOHNSON 2,580,788
SELECTIVE PRINTING AND PUNCHING MECHANISM
Original Filed Nov. 6, 1946 11 Sheets-Sheet 6

INVENTOR
Reynold B. Johnson
BY
ATTORNEY

Patented Jan. 1, 1952

2,580,788

UNITED STATES PATENT OFFICE 2,580,788

SELECTIVE PRINTING AND PUNCHING MECHANISM

Reynold B. Johnson, Binghamton, N. Y., assignor to International Business Machines Corporation, New York, N. Y., a corporation of New York Original application November 6, 1946, Serial No. 708,163. Divided and this application July 1, 1948, Serial No. 36,327

7 Claims. (Cl. 101—19)

This application is a division of applicant's copending application Serial No. 708,163, filed November 6, 1946, now Patent No. 2,524,127, granted October 3, 1950.

This invention relates to printing machines and more particularly to printing machines in which characters are formed by selectively actuating character forming wires whose ends directly form the characters.

The principal object of the invention is to provide a novel selecting and operating mechanism for a so-called wire printer composed of relatively few parts and which is not expensive and can be manufactured very easily.

A further object of the invention resides in the provision of record punching devices and selecting mechanism therefor to select combinations of punches representative of a character, in which the punches are arranged so that upon their operation they will adjust the print selecting and actuating element in accordance with the character punched, whereby there will be a concurrent punching and printing of a selected character.

A further object of the invention is to provide a compact mechanism wherein the moving parts are operative within short limits of movement for printing any of a number of alphabetic, numeric or special characters at high speed.

Other objects of the invention will be pointed out in the following description and claims and illustrated in the accompanying drawings, which disclose, by way of example, the principle of the invention and the best mode, which has been contemplated, of applying that principle.

In the drawings:

Fig. 15 is a greatly enlarged face view of the print wire selecting and actuating plate.

Figures 1, 2:
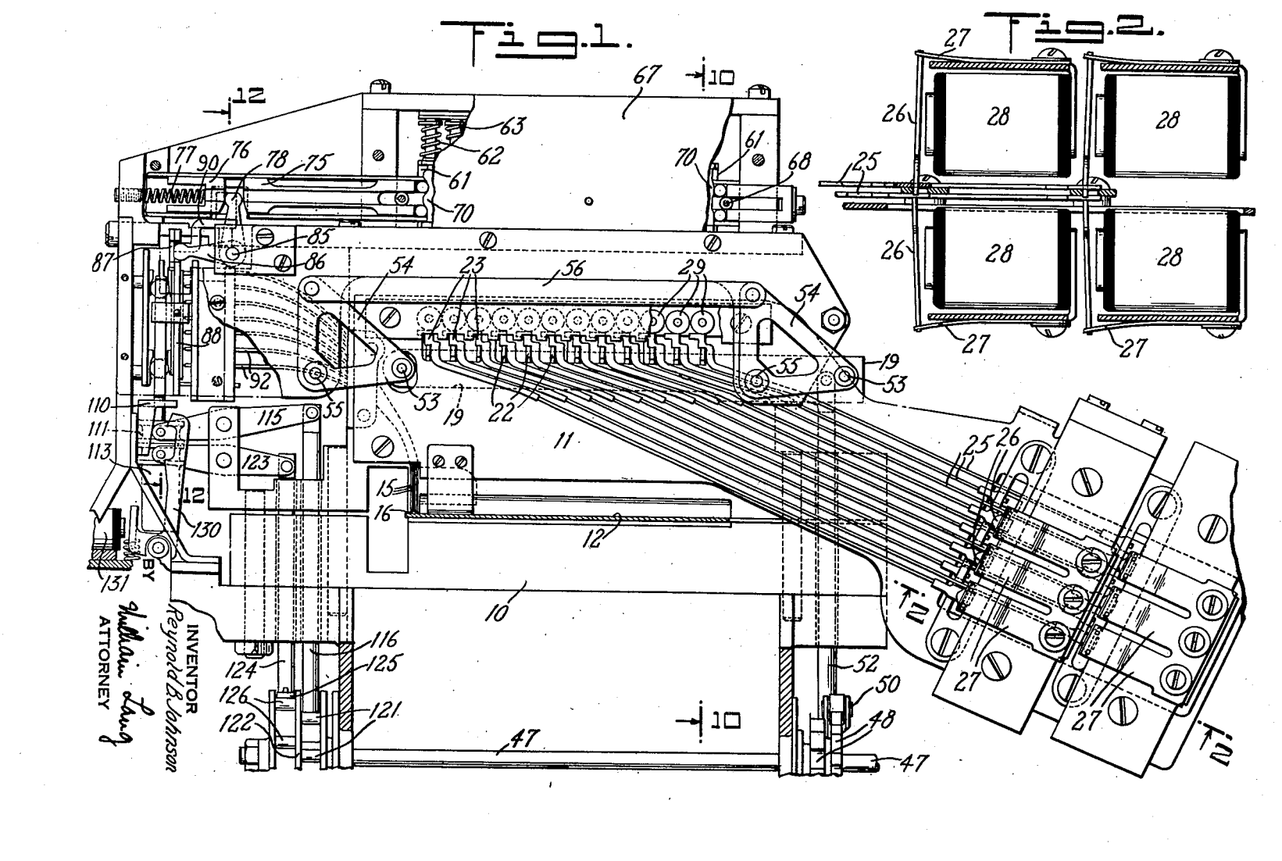
Fig. 1 is an assembly showing the relative location of the printing and punching devices and the selecting devices therefor.
Fig. 2 is a detail section taken on lines 2—2 of Fig. 1 showing the magnetic operators for the punch selection.
Figure 3:
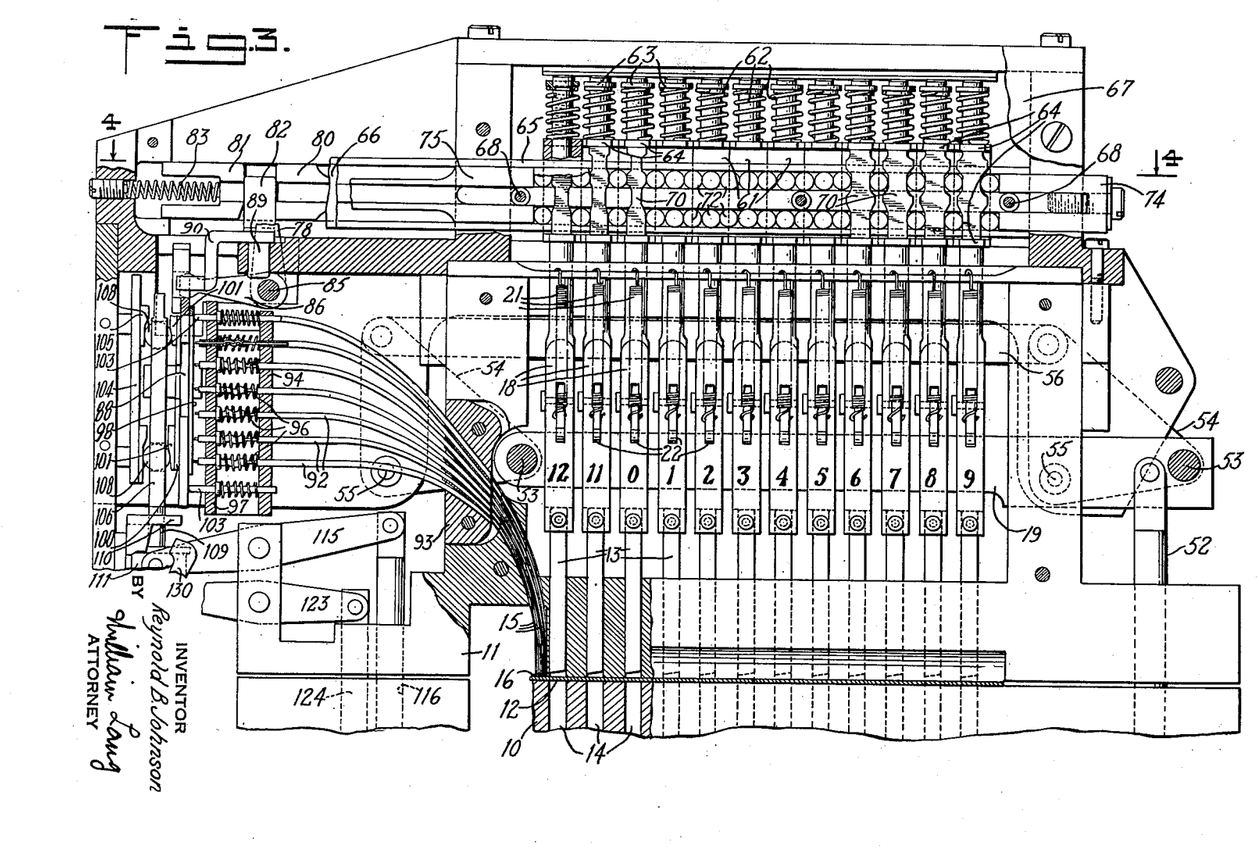
Fig. 3 is an enlarged assembly looking in the same directtion as Fig. 1 showing the printing wires and their relation to the punches.
Figures 10, 11:
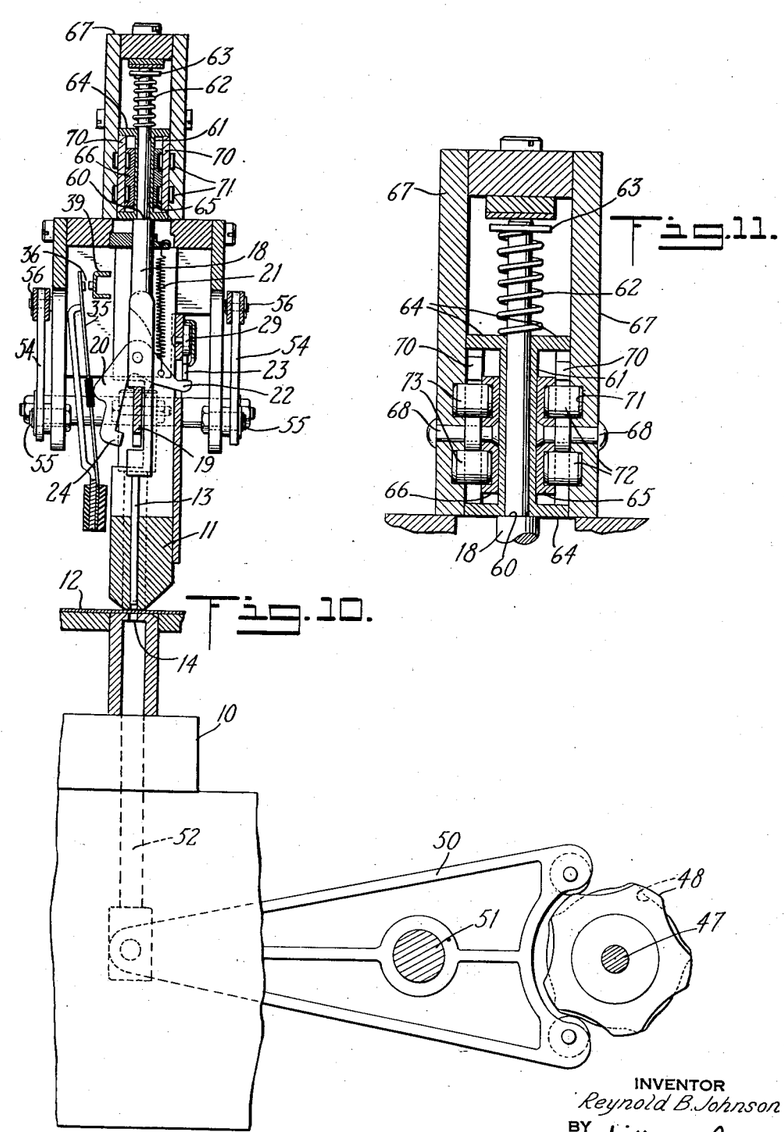
Fig. 10 is a section taken on lines 10—10 of Fig. 1, showing the punch selecting and operating mechanism.
Fig. 11 is an enlarged detail of one of the punch actuated slide operators.

Referring to Figs. 1, 3 and 10, the apparatus comprises a base 10 and an upper section 11, which are spaced apart to enable the passage of a record card 12 or other record receiving material therebetween. Supported in the upper section 11 is a row of twelve punches 13 cooperable with suitable die openings 14 in the base 10, and in line therewith is a group of wires 15 arranged with the ends thereof disposed in a rectangle five wires in width and seven wires in length. Between the wire ends and card 12 is an ink ribbon represented at 16.

The particular manner in which the card is supported and positioned beneath the punches and wires forms no part of the present invention, so that such mechanism is not illustrated, and it will suffice to state that the card is inserted in the position shown in Fig. 3 to receive punching and printing in a selected column thereof, and then manually shifted to present another parallel column for punching and printing in such other column.

Figure 8:
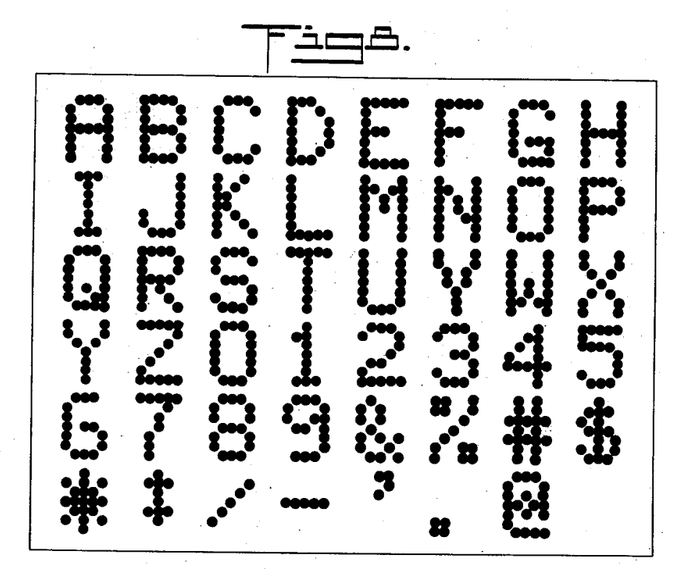
Fig. 8 is a chart showing the various characters that may be selectively printed by the apparatus of the invention.
Figure 9:
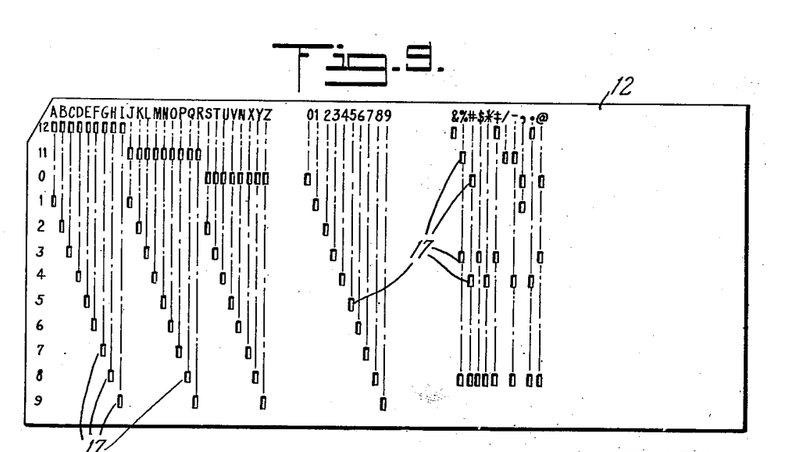
Fig. 9 is a card showing the manner in which the several characters are punched and printed by the apparatus.

With the card positioned as stated, the punches 13 will be operated to punch single or multiple holes 17 (see Fig. 9) representative of the character appearing across the top of the card and, as the punches operate, they will cause selective movement of wires 15 to print a pattern of the character corresponding to the hole or combination of holes punched. These wire patterns are separately shown in Fig. 8. It is to be noted that, with the wire ends in contacting engagement with one another, the patterns are printed as tangential dots in parts of their outline, and due to the tendency of the ink pressed from the ribbon to spread slightly these portions of the outline will have the appearance of a continuous line.

Punching mechanism

The devices for selecting and operating the punches will first be described, and thereafter it will be explained how the punches effect selection of the printing wires to effect printing of the character corresponding to the hole or holes punched.

Referring to Fig. 10, each of the punches 13 is integral with a stem 18 guided for vertical reciprocation and notched to straddle an operating bar 19. Pivoted to each stem 18 is a bell crank 20 biased counterclockwise by a spring 21. The horizontal arm 22 of the bell crank normally lies under an edge of an interposer 23 (see Fig. 1) which holds the bell crank in the position shown in Fig. 10.

Figure 7:
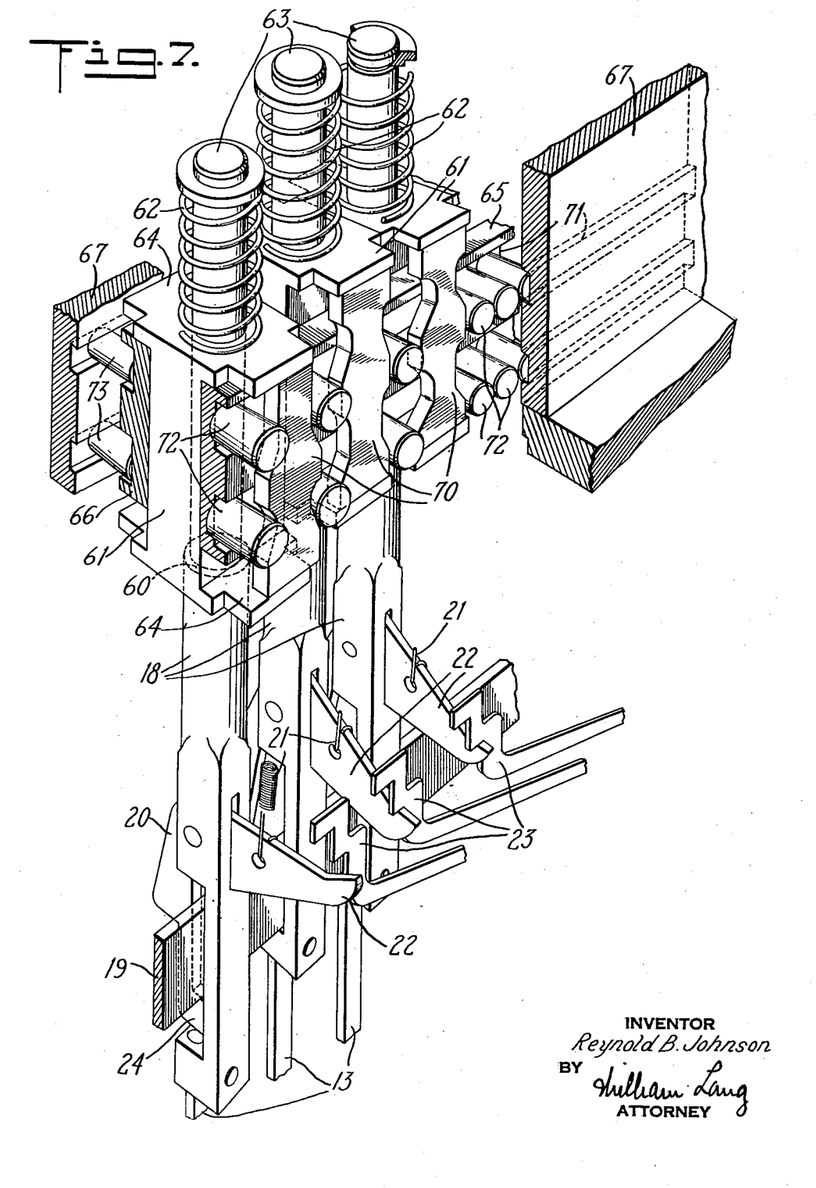
Fig. 7 is an enlarged isometric view of three punches and the slide operating mechanism controlled thereby.

When any interposer 23 is drawn to the right as viewed in Fig. 1, it will release its related arm 22 whereupon spring 21 will rock the bell crank 20 into the position shown in Fig. 7, where the hooked end 24 thereof lies beneath bar 19.

Each interposer 23 has integral therewith a rod 25 whose lower end is flattened and provided with an opening into which the free end of an armature 26 extends (Fig. 2). The armature is integral with a leaf spring 27 so that, when magnet 28 (of which there are twelve arranged in a compact formation) is energized, armature 26 is attracted and will draw its related rod 25 and interposer 23 to the right as viewed in Fig. 1 to release arm 22. Upon deenergization of the magnet, spring 27 will rock the armature 26 and connected parts back to their initial positions. The upper extremities of interposers 23 abut against rollers 29 provided to facilitate the sliding action by lessening frictional resistance.

Figure 18:
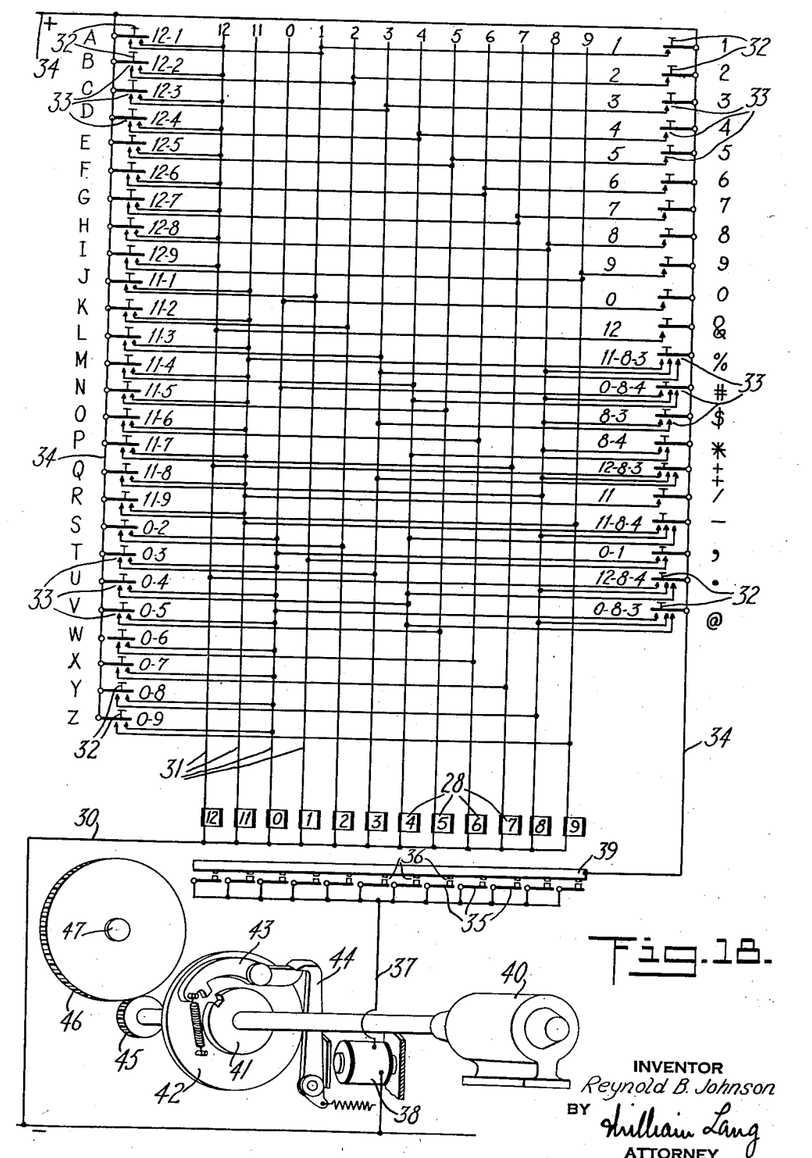
Fig. 18 is a wiring diagram of the electric circuits for controlling the operation of the apparatus.
Figure 19:
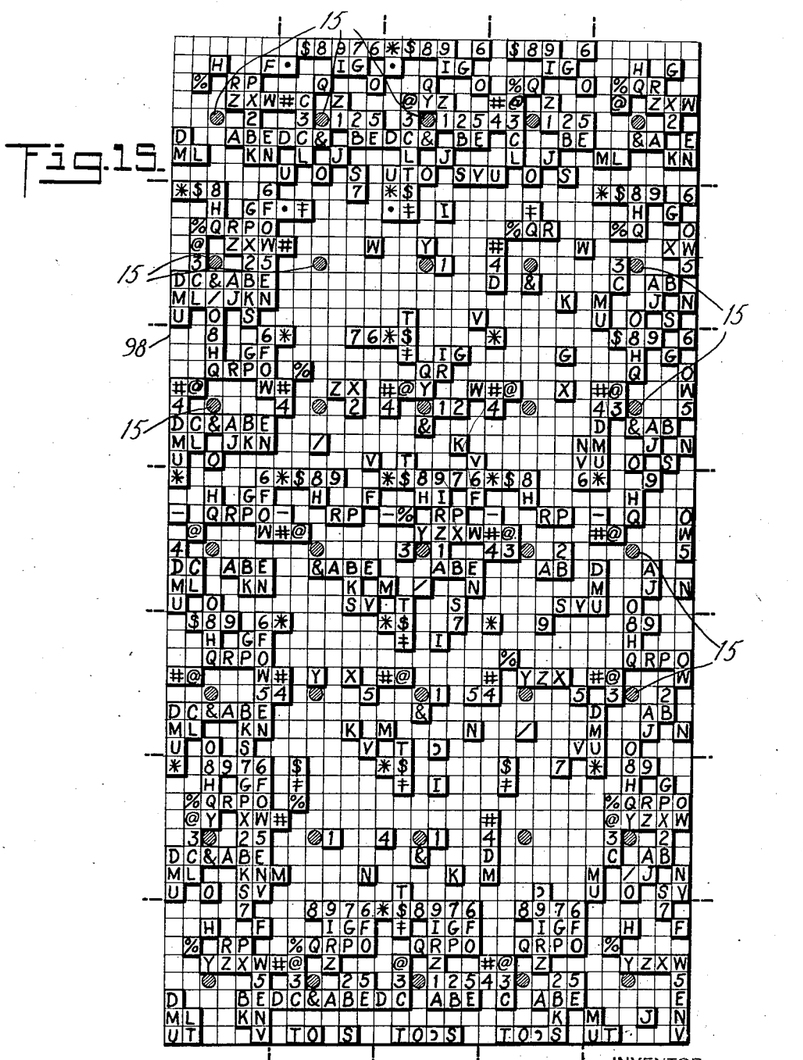

The punches 13 and their stems 18 are numbered 12, 11, 0, 1, 2, 3, 4, 5, 6, 7, 8 and 9 to represent the vertical card positions (see Fig. 9) with which they cooperate, and the controlling magnets 28 are similarly numbered in the circuit diagram (Fig. 18). The twelve magnets are connected through a wire 30 to negative side of a suitable current source, and each is also connected to a wire 31 numbered to correspond to related magnets.

A plurality of keys 32 is provided, one for each of the forty-seven possible characters, and each key upon operation will close one or a plurality of contacts 33 which will complete a circuit or circuits from the positive side of the current source and wire 34 to the magnet or magnets 28 representing the character selected. For example, if the A key 32 is depressed, it closes its two contacts 33 to complete parallel circuits from wire 34 to the 12 and 1 wires 31 and the 12 and 1 magnets 28 to wire 30. This results in shifting the related interposers 23 so that the bell cranks 20 of the 12 and 1 punches 13 will be coupled to the punch bar 19 for operation thereby. The other character and symbol combinations can be similarly traced for each of the other keys.

Referring to Fig. 10, when bell crank 20 is in the position shown, it engages a contact blade 35 to hold it in the position shown and, when the bell crank is rocked counterclockwise, blade 35 will pivot under its own resiliency to close a pair of contacts 36. There is a blade 35 for each of the bell cranks, and these are represented in Fig. 18 connected to a wire 37, extending to a clutch magnet 38. One side of each pair of contacts 36 is carried by a common bar 39 connected to wire 34 so that, when any one or any multiple of bell cranks 20 is or are rocked, contacts 36 complete a circuit to energize clutch magnet 38 which will cause the punch bar 19 to be reciprocated as follows. Motor 40 runs constantly and drives a clutch driving element 41 adjacent to which is a disk 42 carrying a spring pressed dog 43. Energization of magnet 38 will attract its armature latch 44 releasing dog 43 for engagement in the driving notch of element 41, whereby disk 42 will be driven for one revolution during which magnet 38 is deenergized to return armature 44 to releasing position. The parts just described represent diagrammatically a well known so-called one revolution clutch.

Integral with disk 42 is a gear 45 driving a gear 46 on shaft 47 at a 5 to 1 ratio so that for each revolution of disk 42 shaft 47 makes a fifth of a revolution. This shaft as shown in Fig. 10 has a pair of five-lobe complementary cams 48 secured thereto cooperating with a rocker arm 50 pivoted at 51. Arm 50 is articulated to a vertical rod 52 (Figs. 1, 3 and 10) whose upper end is connected to punch bar 19. The bar 19 has pins 53 at opposite ends extending to a pair of bell cranks 54 pivoted to the framework at 55 and connected together by a link 56. Thus, when rod 52 is reciprocated, the parallel motion device 54, 56 will cause the bar 19 to move down and draw with it the punches whose hooks 24 have been rocked.

The operation of the keys 32 is momentary so that during the down stroke of bar 19 the magnets 28 become deenergized and interposers 23 slide back into position. When the bar 19 returns upwardly, positively retracting the punches, arm 22 will engage the restored interposer and bell crank 20 will be rocked back to its unhooked position of Fig. 10, incidentally rocking blade 35 to open contacts 36, so that clutch magnet 38 is deenergized before the completion of the cycle.

Operation of the selecting slides

The upper end of each punch stem 18 is of a reduced diameter, providing a shoulder 60 (Figs. 10, 11 and 7) upon which a block 61 slidable on the stem normally rests. A spring 62 bears against a collar 63 secured to the upper end of stem 18 and against the top of block 61 to urge it against shoulder 60. With such construction, the block 61 reciprocates with the punch 13 with stem 18 being drawn downwardly through spring 62 and returned upwardly by shoulder 60.

Block 61 has laterally extending flanges 64 between which a stationary bar 65 extends on one side and a stationary bar 66 extends on the opposite side. These bars are supported through spacing rivets 68 (Fig. 11) by the main side plates 67 and are dimensioned so as not to interfere with the reciprocation of the blocks 61.

Each block 61 has an interposer 70 (Figs. 3 and 7) positioned between flanges 64 on one side or the other and disposed in the space between bar 65 and plate 67 or bar 66 and opposite plate 67, so that as the block is reciprocated its related interposer also moves up and down in the space between bar and plate. The interposer 70 is freely disposed between the flanges 64, so that it may slide laterally. Bar 65 and its related plate 67 are each provided with a pair of oppositely facing channels 71 into which rollers 72 extend. Bar 66 and its related plate 71 are similarly channeled to receive rollers 73. These rollers are free to shift laterally in the channels.

Figure 4:
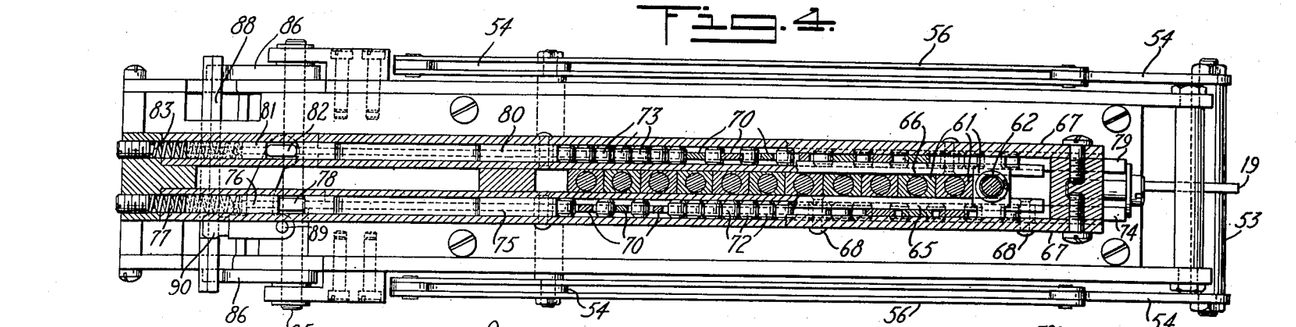
Fig. 4 is a plan section taken on lines 4—4 of Fig. 3, showing the punch operated slides for controlling the print selector.

Referring to Figs. 1 and 3, rollers 72 farthest to the right abut against a fixed stop 74 and the one farthest to the left abuts a slide 75. In line with this slide (Fig. 1) is a short slide 76 urged by spring 77 against a lever 78 between the two slides, so that the pressure exerted by spring 77 urges all the rollers 73 and interposers at the forward side of the blocks 61 toward the right as shown in Fig. 3. On the opposite side of blocks 61 there is a similar arrangement (see Fig. 4) including a fixed stop 79, slides 80, 81, lever 82 and actuating spring 83.

Figure 6:
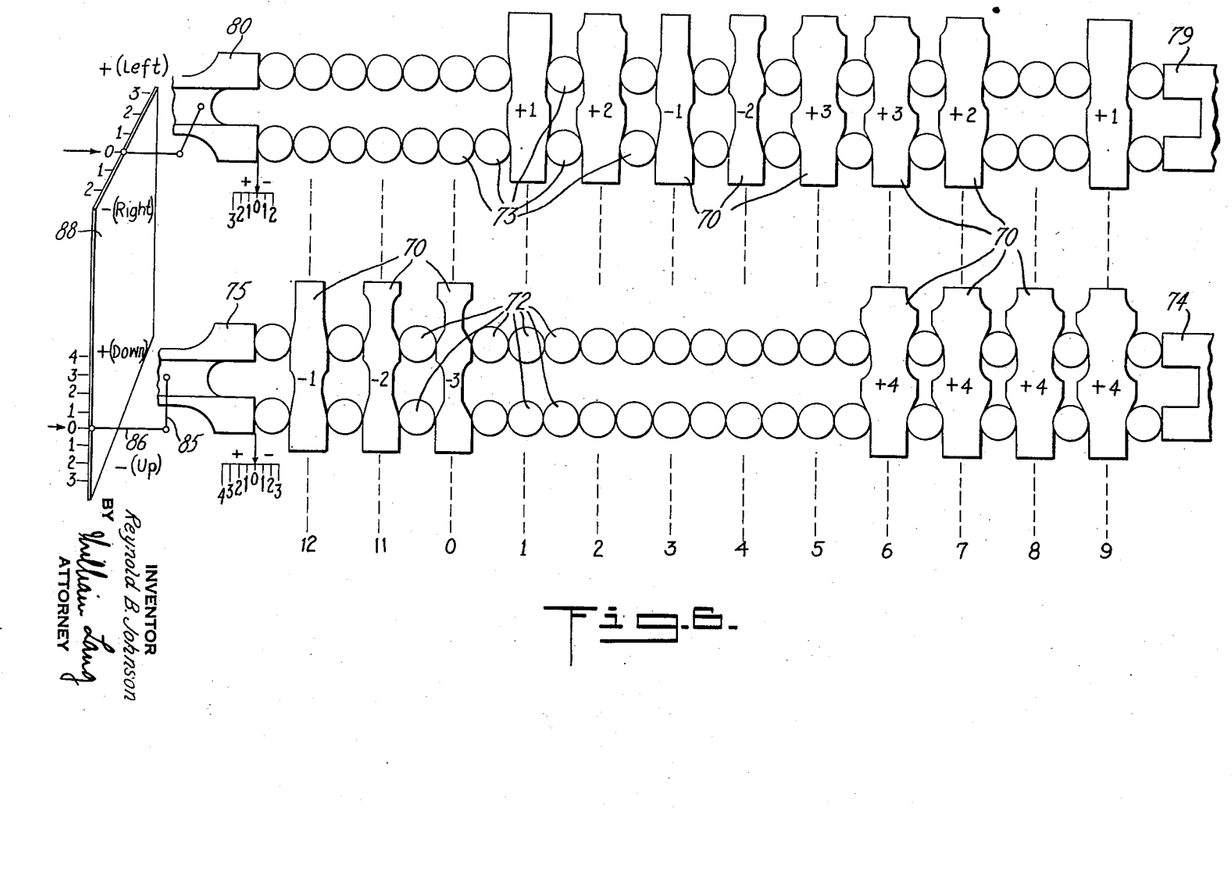
Fig. 6 is a diagram illustrating the principles embodied in the mechanism for effecting the print selection.

In Fig. 6 the two sets of opposite rollers 72, 73 and related interposers are shown diagrammatically, one above the other, with numbered dotted lines indicating the related punches. Thus, the 12, 11, 0 and 4 punches, when operated, each move down a single interposer of the forward or lower set. The 1, 2, 3, 4 and 5 punches when operated each move down a single interposer of the rear or upper set. The 6, 7 and 9 punches when operated each move down a pair of interposers, one in each set.

The several interposers have variously configured vertical camming edges, some of which when the interposer is moved down will increase the space between adjacent rollers and shift slides 75 and 80 to the left. Others will decrease this distance so that slides 75 and 80 move to the right under the influence of their springs 77 and 83 respectively. Slide 75 may move one, two or three steps to the right and one, two, three or four steps to the left as indicated by the scale, while slide 80 may move one or two steps to the right and one, two or three steps to the left. The several interposers are marked +1, +2, +3, +4 to indicate that, when one of these is depressed, it will shift its slide one, two, three or four steps to the left. Those marked −1, −2 and −3 will permit their slides to shift one, two or three steps to the right. Thus, if the 12 punch is operated, the left hand interposer in the lower row is depressed to bring its portion of least width into alignment with the rollers 72, decreasing the spacing and allowing slide 75 to shift one step to the right.

In the following table are listed separately for each possible character the punching combination and the distance moved, together with the direction taken, of the slides 75 and 80.

| Character | Punches | Slide 75 | Slide 80 |
| --- | --- | --- | --- |
| A | 12, 1 | −1 | +1 |
| B | 12, 2 | −1 | +2 |
| C | 12, 3 | −1 | −1 |
| D | 12, 4 | −1 | −2 |
| E | 12, 5 | −1 | +3 |
| F | 12, 6 | +3 | +3 |
| G | 12, 7 | +3 | +2 |
| H | 12, 8 | +3 | 0 |
| I | 12, 9 | +3 | +1 |
| J | 11, 1 | −2 | +1 |
| K | 11, 2 | −2 | +2 |
| L | 11, 3 | −2 | −1 |
| M | 11, 4 | −2 | −2 |
| N | 11, 5 | −2 | +3 |
| O | 11, 6 | +2 | +3 |
| P | 11, 7 | +2 | +2 |
| Q | 11, 8 | +2 | 0 |
| R | 11, 9 | +2 | +1 |
| S | 0, 2 | −3 | +2 |
| T | 0, 3 | −3 | −1 |
| U | 0, 4 | −3 | −2 |
| V | 0, 5 | −3 | +3 |
| W | 0, 6 | +1 | +3 |
| X | 0, 7 | +1 | +2 |
| Y | 0, 8 | +1 | 0 |
| Z | 0, 9 | +1 | +1 |
| 0 | 0 | −3 | 0 |
| 1 | 1 | 0 | +1 |
| 2 | 2 | 0 | +2 |
| 3 | 3 | 0 | −1 |
| 4 | 4 | 0 | −2 |
| 5 | 5 | 0 | +3 |
| 6 | 6 | +4 | +3 |
| 7 | 7 | +4 | +2 |
| 8 | 8 | +4 | 0 |
| 9 | 9 | +4 | +1 |
| & | 12 | −1 | 0 |
| % | 11, 8, 3 | +2 | −1 |
| # | 0, 8, 4 | +1 | −2 |
| $ | 8, 3 | +4 | −1 |
| * | 8, 4 | +4 | −2 |
| ‡ | 12, 8, 3 | +3 | −1 |
| / | 11 | −2 | 0 |
| . | 11, 8, 4 | +2 | −2 |
| , | 0, 1 | −3 | +1 |
| - | 12, 8, 4 | +3 | −2 |
| @ | 0, 8, 3 | +1 | −1 |

In the foregoing manner, the punching of each character hole or combination of holes will be accompanied by a differential positioning of slides 75 and 80 in either a leftward or rightward direction.

Figures 16, 17:
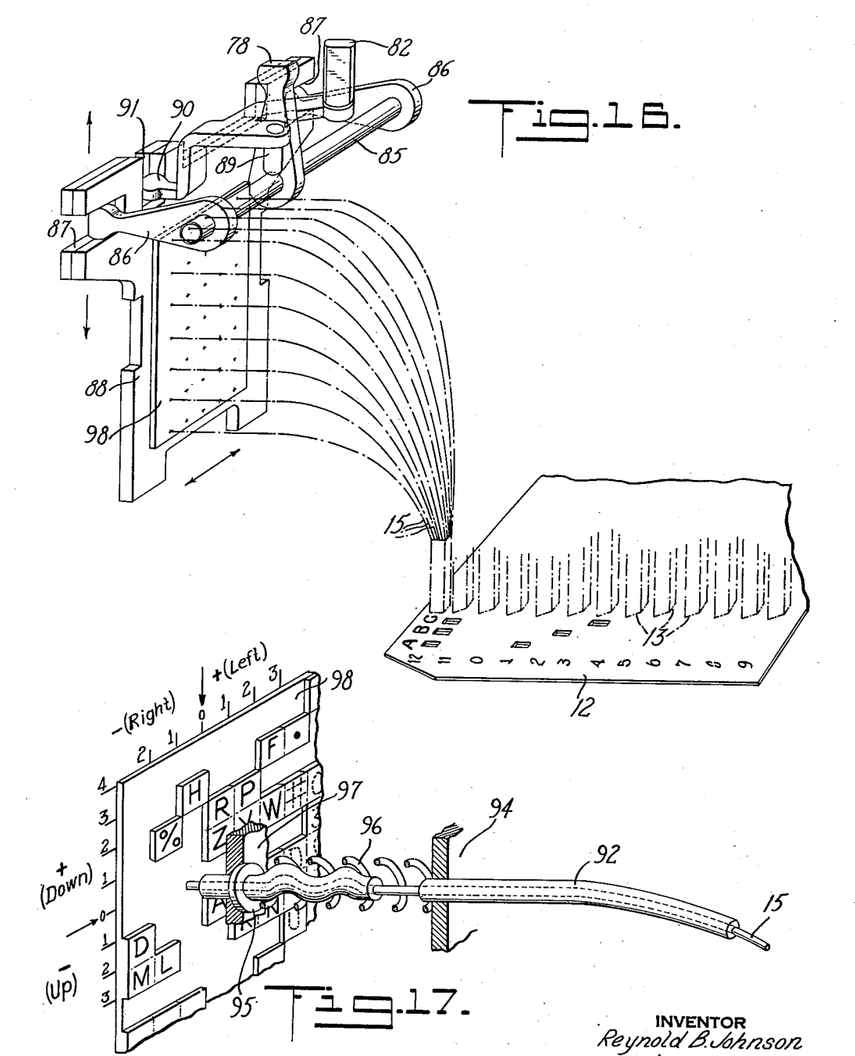
Fig. 16 is a perspective showing the relation between the printing plate, the printing wires and the punches.
Fig. 17 is an enlarged view of a corner of the printing plate and one of the print wires.

In Fig. 1, the slide 75 will position lever 78 to rock a rod 85, which as best shown in Fig. 16 has a pair of arms 86 engaging in notches 87 of a plate 88, so that the plate 88 is positioned up or down accordingly as slide 75 is right or left.

The slide 80 (Fig. 4) will position lever 82 about its pivot 89 (see Fig. 16) and rock an integral finger 90 engaging in a notch 91 of plate 88, so that the plate is positioned forward or rearward accordingly as slide 80 is positioned left or right. Thus, for each of the forty-seven possible characters, the plate 88 will be adjusted in forty-seven different positions.

*Printing wire selection*

In Fig. 3, the wires 15, of which there are thirty-five as stated, extend through tubes 92 anchored in a member 93 and a plate 94. Fig. 16 shows the direction in which the wires are spread to form a rectangle at their left ends across the face of plate 88. The portion of the wires to the right of member 93 extend through openings in the base 11 which serves to hold the lower ends in compact juxtaposition. At the upper end, each wire (see Fig. 17) has crimped thereon a collar 95 engaged by a spring 96 which serves to hold the wire retracted as shown, with fixed plate 97 serving as a limit stop.

Integral with plate 88 is a metallic sheet 98 etched with a pattern of high and low portions. The surface of this plate appears as shown in Fig. 15 at a greatly enlarged scale, and in this figure the wires 15 are indicated by sectional circles in the relative relationship before the plate 88 is positioned by the punching devices. As explained, the plate may be positioned up or down and to the right or left with respect to the wires, and these movements are so proportioned that each wire will cooperate with any one of forty-seven squares surrounding the square it initially confronts.

After the plate is positioned, it is pressed toward the wires and, whenever a high portion of sheet 98 is in line with a wire, such wire will be actuated to print a mark on the record. Fig. 17 shows the arrangement for the wire 15 in the upper left hand corner, from which it is seen that this wire is used in printing of the characters H, F, %, R, P, Z, X, W, 2, D, A, B, E, M, L, K, and N. It will be noted also in Fig. 16 that this wire 15 prints the lower left hand corner of these characters, and it will be noted in Fig. 8 that each of the characters listed above has a dot in the extreme lower left hand corner.

To take a specific example, such as the letter A, when the 12 and 1 punches operate, plate 88 is shifted one step up and one step to the left which will bring all the raised portions marked A into line with the wires forming the pattern for this letter. In Fig. 15 these are the six uppermost wires in the left hand column and in the right hand column the three central wires in the bottom row. All other wires will be opposite low portions, so that their wires are not effectively actuated.

From Fig. 6 it can readily be determined for each character, in which direction and to what extent plate 88 is shifted. Thus, for example, the letter B punched as a 12 and 2 hole shifts plate 88 one step up and two steps to the left. Looking at Fig. 15, one step up and two steps to the left bring all squares marked B into alignment with the wires to form the pattern of this character.

*Wire actuating mechanism*

Figures 12, 13, 14:
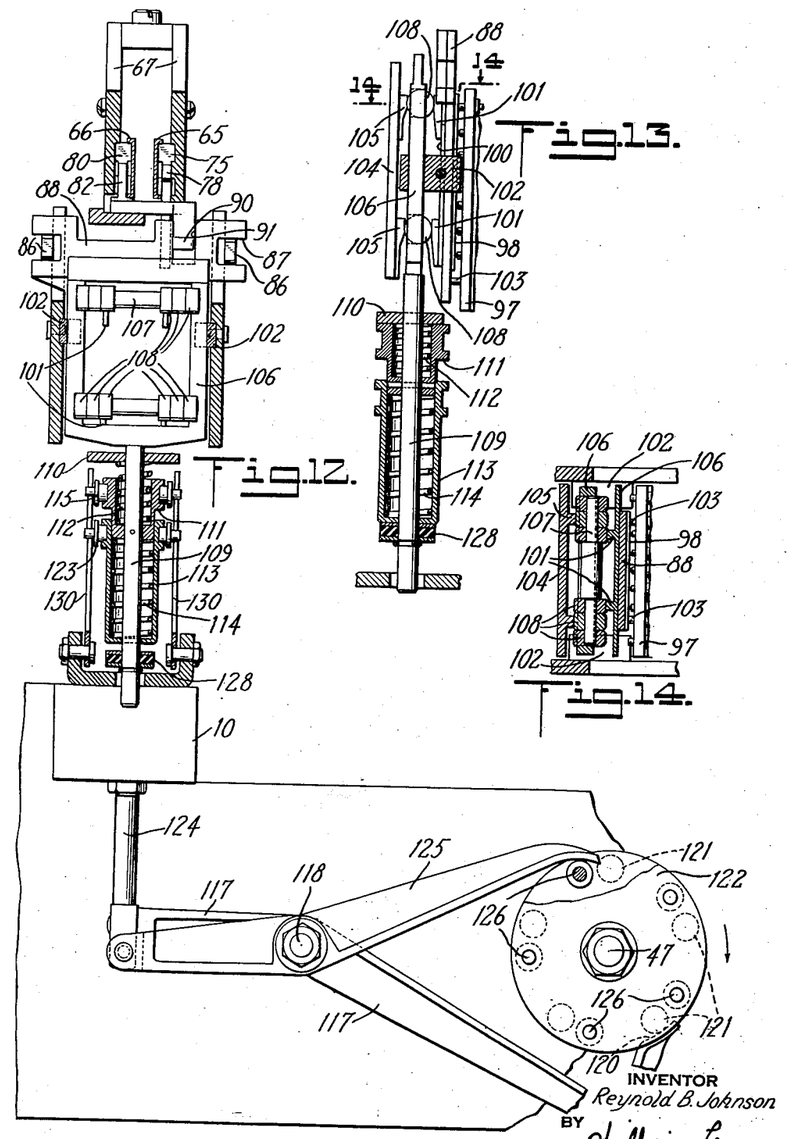
Fig. 12 is a section taken on lines 12—12 of Fig. 1, showing the print operating mechanism.
Fig. 13 is a detail of the print operating devices in an operating position.
Fig. 14 is a section taken on lines 14—14 of Fig. 13.

Referring to Figs. 3, 13 and 14, the plate 88 has adjacent thereto a plate 100 provided with cam surfaces 101. The plate 100 is notched to straddle fixed blocks 102 so that it may move toward and away from plate 88 but is constrained against vertical movement. Spring pressed plungers 103 (Fig. 3) normally bear against plate 88 to hold it in the position of Fig. 3 away from the wire ends, and as the plate 88 is differentially positioned by the punches it will slide across the face of plate 100.

To the left of plate 100 is a stationary member 104 with cam surfaces 105. Between cam surfaces 101 and 105 is a frame 106 notched to receive a pair of rods 107 carrying rollers 108. This frame rides in notches in blocks 102, so that it can move vertically but not horizontally (as viewed in Fig. 13). Upon elevating the frame, rollers 108 will ride along cams 105 and shift rightward in their notches, at the same time forcing cams 101 to the right along with plates 100 and 88 to effect printing action. Upon retraction of the frame, plungers 103 return the parts to normal position.

Frame 106 has integral therewith a rod 109 extending through a fixed guide 110. Pinned to the rod is a cup 111 within which there is a spring 112. Surrounding cup 111 is a sleeve 113 loose on the rod and containing a spring 114.

Referring to Figs. 3 and 1, cup 111 is grooved to receive a pin in lever 115 which is connected by rod 116 to a lever 117 pivoted at 118 (Fig. 12). The free end of this lever has a surface 120 in line with pins 121 carried by disks 122 on shaft 47. In the position of Fig. 12 a pin 121 is holding lever 117 and through the connections traced cup 111 is held in the position of Fig. 12 against the action of spring 114.

Sleeve 113 is similarly grooved to receive a pin in lever 123 (Figs. 1 and 12) which is connected by a rod 124 to a lever 125 pivoted at 118. The free end of this lever is in line with pins 126 carried by disks 122. In the position of Fig. 12 a pin 126 has rocked lever 125 a slight amount to hold sleeve 113 in the position shown, where it compresses spring 114 a small amount.

Figure 5:
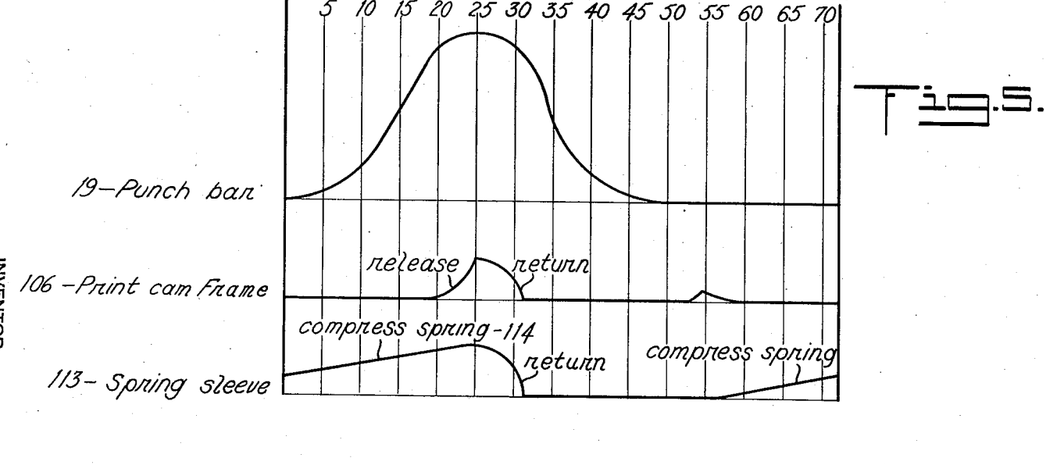
Fig. 5 is a time chart of the drive devices.

The position of the parts in Fig. 12 is that during the rest position of the apparatus and as explained, when a key selection is made, shaft 47 is turned through a fifth of a revolution. Fig. 5 shows the relative movements during this fifth revolution of the punch bar 19, the frame 106 and the sleeve 113. Thus, as the bar 19 moves to force the punch or punches through the card from 0° to 25°, pin 126 (Fig. 12) rocks lever 125 counterclockwise to elevate sleeve 113 and compress spring 114 still further. Up until about 20°, cup 111 remains locked so that at such point it is under considerable pressure. At 20° roller 121 rides off surface 120 freeing cup 111, so that spring 114 now released will urge cup 111 and frame 106 rapidly upward to effect printing in the interval between 20° and 25°. This position of the parts is shown in Fig. 13 where a bumper disk 128 limits the extent of upward movement of stem 109.

At 25° both levers 117 and 125 are free of their acting pins 121 and 126, respectively, so that spring 112 in cup 111 will move both cup 111 and sleeve 113 through spring 114 downwardly and near the end of the fifth of a revolution the next pin 121 will engage and lock lever 117 and cup 111, while the next pin 126 moves bar 125 and sleeve 113 to effect the slight initial compression of spring 114.

When it is desired to punch without the accompanying printing, a hook 130 (Fig. 1) may be rocked counterclockwise manually or through action of magnet 131 to engage pins in the ends of levers 115 and 123 to lock them in the position shown in Fig. 1. In such position it will be noted that lever 117 is held out of cooperative relationship with pins 121 and lever 125 is also held out of effective range of pins 126 so that, when shaft 47 turns, the levers will remain substantially as in Fig. 1. Although the print plate 88 takes a character selecting position, it will not be shifted against the wires.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a machine of the class described, a row of punches, one for each index point position of a column of a record card, a group of printing wires, means for selectively actuating the punches, devices controlled by the punches and effective upon the actuation of a punch for selecting the printing wires of said group whose arrangement corresponds to the punch actuated, and means for actuating the selected printing wires.

2. In a machine of the class described, a row of punches, one for each index point position of a column of the record card, a group of printing wires, means for selectively actuating the punches, singly or in combinations, devices controlled by the punches and effective upon the actuation of a punch or combination of punches for selecting the printing wires of said group, whose arrangement corresponds to the character represented by the punch, or combination of punches actuated, and means for actuating the selected printing wires.

3. In a printing and punching machine, a row of punches, one for each index point position of a column of a record card, selecting and actuating means therefor, a group of printing wires adapted to print in line with said row of punches, a pair of slides differentially positionable by said punches to represent the character punched, mechanism controlled by said slides for selecting printing wires corresponding to the pattern of the character punched, and means for actuating the selected wires during the actuation of the punches.

4. In a printing and punching machine, a row of punches, one for each index point position of a column of a record card, selecting and actuating means therefor, a group of printing wires adapted to print in line with said row of punches, a pair of slides, each differentially positionable in two directions by said punches to represent the character punched, mechanism controlled by said slides for selecting printing wires corresponding to the pattern of the character punched, and means for actuating the selected wires during the actuation of the punches.

5. In combination, a row of disks lying in a common plane and guided for movement along a straight line, means for urging the disks toward one another, cam elements extending between certain pairs of adjacent disks, a punch connected to each element, means for selectively operating the punches, movement of any punch causing its related element to move therewith to increase or decrease the distance between adjoining disks, the disk at one end of the line being held against movement whereby the disk at the other end of the line will be positioned differentially, in accordance with the amount of net increase or decrease of the distance between disks, and a recording device controlled by the said other end disk to select a character for recording in accordance with the direction and extent of movement of said disk.

6. In combination, a row of disks lying in a common plane and guided for movement along a fixed line, means for urging the disks toward one another, cam elements extending between certain pairs of adjacent disks, a punch connected to each element, means for selectively operating the punches, movement of any punch causing its related element to move therewith to increase the distance between adjoining disks, the disk at one end of the line being held against movement whereby the disk at the other end of the line will be positioned differentially in accordance with the amount of increase of the distance between disks and a recording device controlled by said other end disk to select a character for recording in accordance with the extent of movement of said disk.

7. In combination, a row of disks lying in a common plane and guided for movement along a fixed line, means for urging the disks toward one another, cam elements extending between certain pairs of adjacent disks, a punch connected to each element, means for selectively operating the punches, movement of any punch causing its related element to move therewith to decrease the distance between adjoining disks, the disk at one end of the line being held against movement whereby the disk at the other end of the line will be positioned differentially in accordance with the amount of decrease of the distance between disks and a recording device controlled by said other end disk to select a character for recording in accordance with the extent to movement of said disk.

REYNOLD B. JOHNSON.

REFERENCES CITED

The following references are of record in the file of this patent:

UNITED STATES PATENTS

| Number | Name | Date |
| --- | --- | --- |
| 2,013,540 | Kolm | Sept. 3, 1935 |
| 2,359,680 | Roth | Oct. 3, 1944 |
| 2,431,714 | Sundstrand | Dec. 2, 1947 |